United States Patent

Gebreselassie et al.

[11] Patent Number: 5,954,252
[45] Date of Patent: Sep. 21, 1999

[54] SLIDABLE DEVICE FOR SUPPORTING GARMENTS WITHIN A VEHICLE

[75] Inventors: Girma M. Gebreselassie, Southfield, Mich.; Mark F. Heinz, Toledo, Ohio

[73] Assignee: UT Automotive Dearborn, Inc., Dearborn, Mich.

[21] Appl. No.: 08/834,350

[22] Filed: Apr. 16, 1997

[51] Int. Cl.$^6$ ........................................... B60R 7/00
[52] U.S. Cl. .................. 224/311; 224/313; 224/927; 224/554; 224/311; 248/304; 248/307; 248/298.1
[58] Field of Search .................... 248/304, 307, 248/692, 340, 215, 221.11, 222.11, 222.12, 223.41, 298.1; 296/214; 224/927, 281, 311, 544, 313, 554

[56] References Cited

U.S. PATENT DOCUMENTS

| | | | |
|---|---|---|---|
| 2,500,881 | 3/1950 | Stader | 248/304 |
| 3,201,077 | 8/1965 | Heimann | 248/307 |
| 3,733,043 | 5/1973 | Binns et al. | |
| 4,004,770 | 1/1977 | Karass | 248/307 |
| 4,503,692 | 3/1985 | Grint | 292/DIG. 2 |
| 4,623,177 | 11/1986 | McKinney | 248/544 |

*Primary Examiner*—Ramon O. Ramirez
*Assistant Examiner*—Willie Berry, Jr.
*Attorney, Agent, or Firm*—Howard & Howard

[57] ABSTRACT

A slidable support device for garments for use in a vehicle includes a support, a hook, and a locking mechanism. The support is coupled to the vehicle. The support includes two longitudinally extending grooves that are spaced from one another. The hook includes two longitudinally extending contact surfaces that are spaced from one another. The hook contact surfaces are shaped to mate with the support grooves in a sliding engagement. Upon engagement of the hook with the support, the hook slides relative to the support. The locking mechanism releasably retains the hook at various longitudinal positions along the support.

18 Claims, 2 Drawing Sheets

5,954,252

SLIDABLE DEVICE FOR SUPPORTING GARMENTS WITHIN A VEHICLE

TECHNICAL FIELD

The present invention relates to an interior accessory for a vehicle, and more particularly to a slidable device for holding garments inside the passenger compartment of an automotive vehicle.

BACKGROUND OF THE INVENTION

Sport utility, minivan vehicles, and station wagons, typically include a large passenger compartment behind the front seats. The passenger compartment includes one or two rows of passenger seats. To the rear of the passenger seats there is a cargo area. Users can access the passenger area by opening a side door. Users can access the cargo area by opening a liftgate or rear door.

In passenger compartments, it is common to have support devices, such as coat hooks, for holding clothing either on hangers or not. These support devices are located against a headliner above the passenger seats or along a plastic molding beside the passengers. Most of these support devices are not movable; however, some hooks are slidably coupled to an assist handle. This allows these hooks to slide only a small amount back and forth. These hooks also have a small storage area.

These conventional supports usually make it uncomfortable for a passenger to sit next to hanging clothes, because the clothes can obstruct their view or violate their seat space.

Therefore a more versatile support device is sought.

SUMMARY

According to an embodiment of the present invention, a slidable support device for garments is disclosed. The support device is for use in a vehicle. The support device includes a first member, a second member and a locking mechanism. The first member is a support that is coupled to the vehicle. The first member includes two longitudinally extending first contact surfaces that are spaced from one another. The second member includes two longitudinally extending second contact surfaces that are spaced from one another. The second contact surfaces are shaped to mate with the first contact surfaces in a sliding engagement. Upon engagement of the second member with the first member, the second member slides relative to the first member. The locking mechanism releasably retains the second member at various longitudinal positions along the first member.

In one embodiment, the first member is attached on the surface of a headliner. In another embodiment, the first member is a bezel that is disposed through a slot in the headliner.

The foregoing invention will become more apparent in the following detailed description of the best mode for carrying out the invention and in the accompanying drawings.

BEST MODE FOR CARRYING OUT AN EMBODIMENT THE INVENTION

Figure 1:
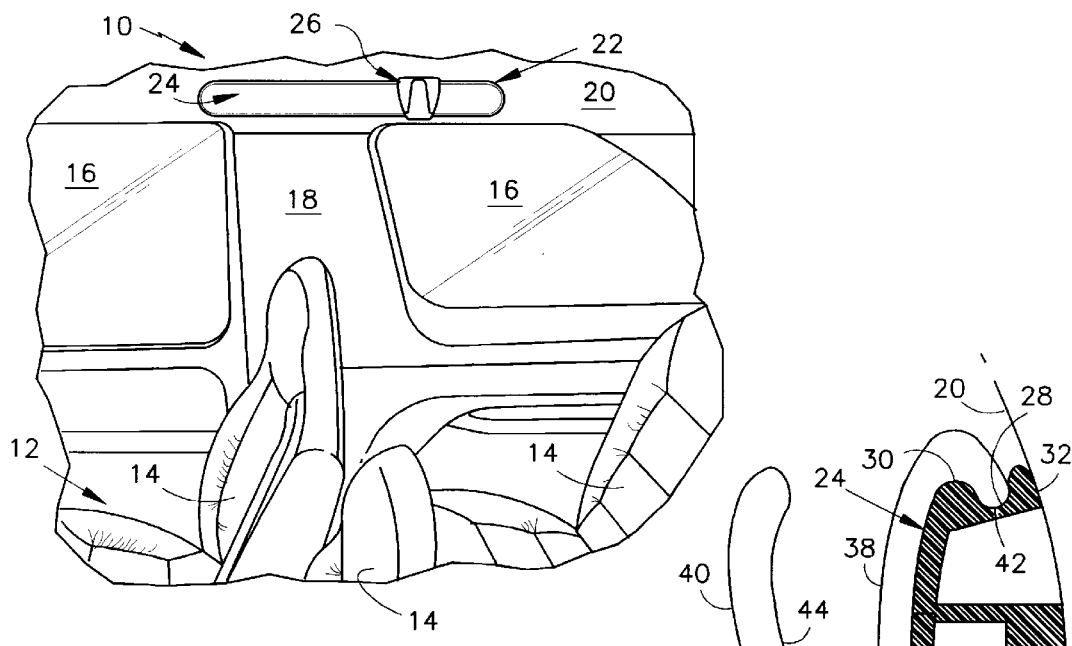
FIG. 1 is a perspective view of a passenger compartment of a vehicle having a slidable support device for holding garments of the present invention.

Referring to FIG. 1, a vehicle 10 includes a passenger compartment 12 having two rows of passenger seats 14. The vehicle 10 further includes a number of side windows 16 separated by a support member 18. A headliner 20 covers the interior surface of the vehicle roof (not shown). The headliner 20 includes a support device 22 for holding garments or other items (not shown). The support device 22 includes a first member or support 24, a second member or hook 26, and a locking mechanism 27 (as shown in FIG. 3).

Figure 2A:
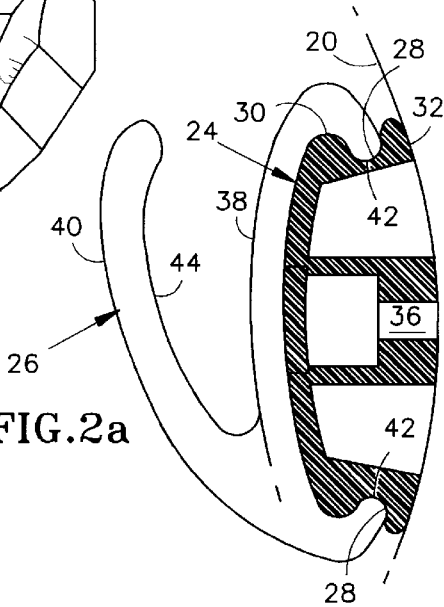
FIG. 2a is a cross sectional view along 2a—2a of FIG. 2 of the slidable support device.
Figure 2:
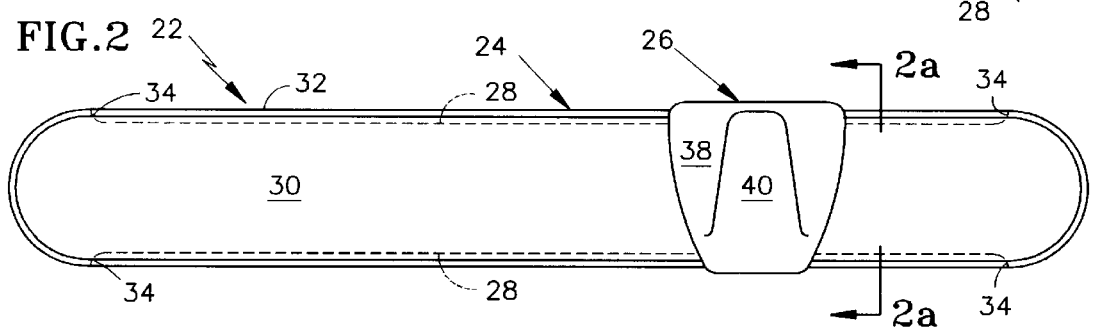
FIG. 2 is an enlarged front view of the slidable support device shown in FIG. 1.

Referring, to FIGS. 2 and 2a, the first member 24 extends longitudinally along the headliner 20 (as shown in FIG. 1), and includes two longitudinally extending grooves 28 formed between a front wall 30 and a rear wall 32. The grooves 28 are the first contact surfaces. Each of the grooves 28 has a C-shaped cross-section. Each of the grooves 28 further includes a shoulder 34 at each end of the grooves 28 to form a stopping means. The first member 24 further includes a plurality of holes, represented by the hole 36. The first member 24 is attached to the headliner 20 using conventional fasteners (not shown), which are disposed through the holes 36 in the first member 24.

The second member 26 includes a C-shaped platform 38 and an integral extension 40. Each of the ends of the platform 38 includes a second contact surfaces 42 contoured to mate with the first contact support surfaces 28. The extension 40 extends from one surface of the platform 38 to form a support area 44 between the extension 40 and the platform 38.

Figure 3:
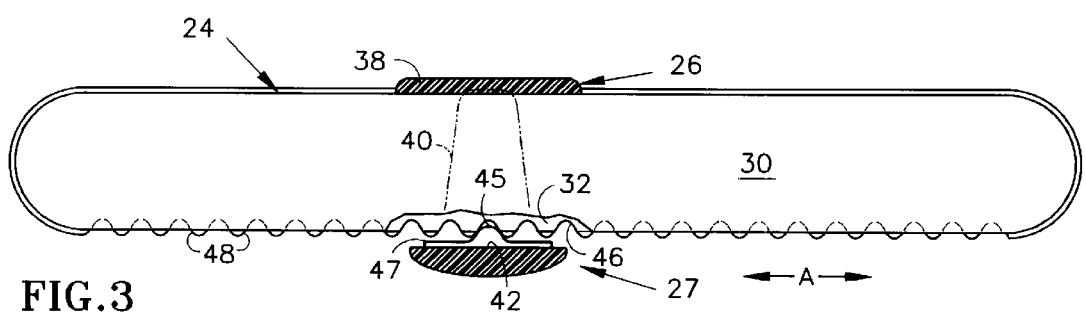
FIG. 3 is a rear view of the slidable support device shown in FIG. 2 with a portion broken away for clarity.

Referring to FIGS. 2a and 3, the locking mechanism 27 includes a projection 44 and a plurality of longitudinally spaced grooves 46, so that a pawl and rachet relationship is formed. The projection 44, in this embodiment, is provided by a tension spring 47 coupled to the lower second contact surface 42 of the second member platform 38. The tension spring is embedded in the second member 26. In this embodiment, the spaced grooves are integrally formed within the first member 24 behind the front wall on the lower first contact surface or groove 28. The locations of the grooves 48 along the length of the member coincide with desired longitudinal positions of the second member 26. The tension spring 47 is shaped to releasably engage the associated groove 48. In another embodiment, the projection 44 can be integrally formed within the lower second contact surface of the second member. The spaced grooves may also be provided by a separate metal or plastic piece that is attached to the lower first contact surface. In this alternate embodiment, the second member may be formed from a resilient material, such as nylon or a similar elastic material, so that by applying pressure to the second member the projection can be removed from the associated groove 48 and by removing the pressure the projection can be released into another groove. In another embodiment, the locking mechanism can be a bent piece of metal or the like having a notch therein. The metal piece is attached to the second member in a manner as described above. The first member has projections for engaging the notch. The projections being at spaced longitudinal positions along the first member. When the notch in the metal piece engages the associated projection, the second member is releasably retained. The locking mechanism also functions to minimize the likelihood of the second member rattling on the first member during vehicle operation.

Once installed, the first member groove first contact surfaces 28 mate with the platform second contact surfaces 42 in sliding engagement, and the second member 26 may slide along the first member 24. In order to move the second member longitudinally along the first member, the movement being represented by the arrow A, the force applied to the second member must be enough to remove the projection 44 from the associated groove 48 and into the desired groove 48.

The second member and first member may be injection molded from a suitable plastic, such as engineering thermoplastic. The tension spring and the separate metal piece with spaced grooves may be stamped from a metal.

Figure 4:
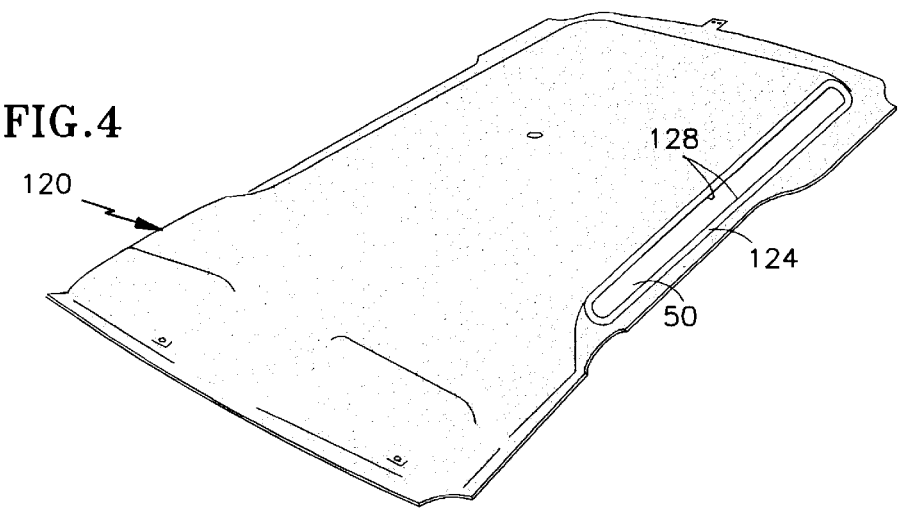
FIG. 4 is a perspective view of a headliner which includes a first member of another embodiment of the slidable support device.
Figure 5:
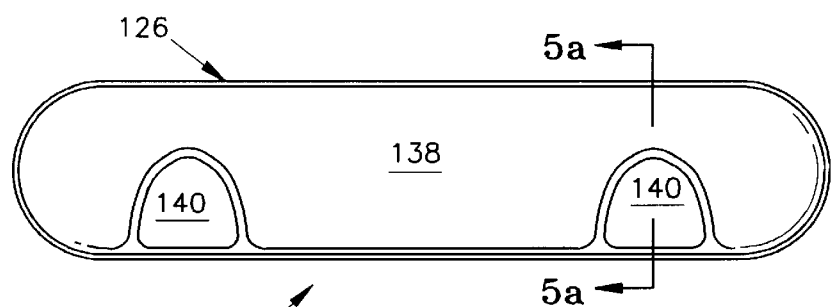
FIG. 5 is a front view of the other embodiment of the slidable support device.
Figure 5A:
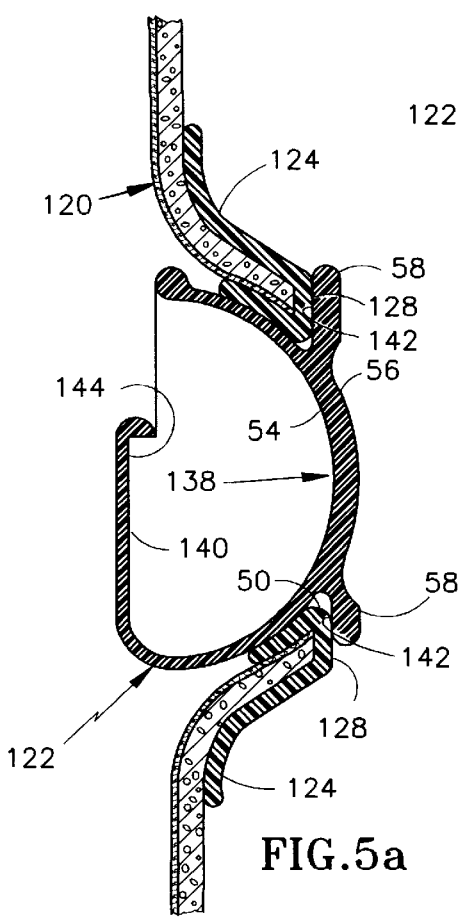
FIG. 5a is a cross sectional view along 5a—5a of FIG. 5 of the other embodiment of the slidable support device.

Referring to FIGS. 4, 5, and 5a, there is illustrated an alternate embodiment of a support device 122. Like or similar elements shown in the embodiment in FIGS. 4, 5, and 5a are identified by the same reference numeral as in FIGS. 1–3, preceded by the numeral "1". The support device 122 for holding garments includes a first member or support 124, a second member or hook 126, and a locking mechanism (not shown). The locking mechanism is similar to those described above. For this embodiment of the support device 122 the headliner 120 includes a longitudinally extending slot 50.

The first member 124 is a bezel which is substantially elliptical and includes two substantially parallel longitudinally extending sides or first contact surfaces 128. The first member 124 surrounds the slot 50 and has a substantially V-shaped cross-section (as shown in FIG. 5a). The first member 124 is dimensioned so that it snaps securely about the headliner 20 around the slot 50.

The second member 126 includes a longitudinally extending platform 138. The C-shaped platform 138 includes an arched front surface 54, an arched rear surface 56, and two spaced integral extensions 140. The extensions 140 extend outwardly from the front surface 54 to form a support area 144 behind the extension 140. The rear surface 56 further includes two longitudinally extending rails 58 which extend from opposite ends to form two second contact surfaces 142 therebetween. The second contact surfaces 142 are contoured to mate with the first member first contact surfaces 128.

Similar materials as those described above may be used to form the components of the second embodiment.

Once installed, the platform second contact surfaces 142 mate with the first member first contact surfaces 128, so that the platform 138 may slide along the sides of the first member 124.

In use garments may be hung on the second members of the support devices or a garment hanger may be placed on the second members. The hangers are supported on the support areas.

While a particular invention has been described with reference to illustrated embodiments, various modifications of the illustrative embodiments, as well as additional embodiments of the invention, will be apparent to persons skilled in the art upon reference to this description without departing from the spirit and scope of the invention, as recited in the claims appended hereto. These modifications include, but are not limited to, modifying the materials used, shapes, and sizes. Furthermore, the number of second members used in either embodiment may be increased or decreased. The second members may be any number of enclosed rings of any size or shape for holding garment hangers. The rings would slide in relation to the first member as described above. The second members may be pivoting slidable hooks or a slidable assist handle. The location of the support device may be moved from the headliner to any position in the passenger compartment as desired. It is therefore contemplated that the appended claims will cover any such modification or embodiments that fall within the true scope of the invention.

We claim:

1. An assembly for holding items in a vehicle, comprising:
   a vehicle headliner including an opening through a portion of said headliner;
   a first member coupled to the vehicle headliner and received by said opening;
   a second member slidably mounted to said first member, said second member for holding the item; and
   a locking mechanism for releasably retaining said second member at various longitudinal positions along said first member.

2. The assembly of claim 1, wherein said locking mechanism includes said first member being a ratchet and said second member being a pawl.

3. The assembly of claim 1, wherein said opening through said vehicle headliner comprises an elongated slot and wherein said first member comprises a bezel that is received about a periphery of said slot.

4. The assembly of claim 3, wherein said second member includes a wall portion having a generally C-shaped cross section with a first extension extending away from one edge of said wall portion to thereby form a hook for receiving and supporting the item and wherein second and third extensions extend away from mid portions of said wall portion and wherein said bezel engages said second member near said second and third extensions, respectively.

5. A support device for holding garments in a vehicle, said support device comprises:
   a first member supported in the vehicle, said first member including two longitudinally extending first contact surfaces, said first contact surfaces being spaced from one another;
   a second member including two longitudinally extending second contact surfaces, said second contact surfaces being spaced from one another, said second contact surfaces being shaped to mate with said first contact surfaces in a sliding engagement, upon engagement of said second member with said first member said second member slides relative to said first member; and
   a locking mechanism for releasably retaining said second member at various longitudinal positions along said first member;
   wherein the first contact surfaces are longitudinally extending grooves that include a shoulder at each end of said grooves for stopping said second member, said first member further including a plurality of spaced holes therethrough for receiving fasteners.

6. The support device of claim 5, wherein the second member further includes a platform having the second contact surfaces; and an integral extension for forming a support area.

7. The support device of claim 6, wherein the locking mechanism further includes a projection extending from at least one of said second contact surfaces; and at least one of said first contact surfaces further including a plurality of longitudinally spaced grooves, such that locations of said spaced grooves along the length of at least one of said first contact surfaces coincide with desired longitudinal positions of said second member on said first member; said projection being shaped to releasably engage a selected one of said spaced grooves.

8. The support device of claim 7, wherein the projection is provided by a tension spring.

9. The support device of claim 7, wherein the spaced grooves are integral with said first member.

10. The support device of claim 9, wherein said second member and said first member are formed from a resilient plastic.

11. The support device of claim 5, wherein said locking mechanism includes said first member being a ratchet and said second member being a pawl.

12. The support device of claim 5, wherein said lower first contact surfaces includes a plurality of longitudinally spaced projections such that locations of said projections along said length of said first member coincide with desired longitudinal positions of said second member on said first member; said locking mechanism including a notch that releasably engages a selected one of said projections.

13. An assembly for holding garments in a vehicle, comprising:
   a first member supported in the vehicle, said first member including two longitudinally extending first contact surfaces, said first contact surfaces being spaced from one another;
   a second member including two longitudinally extending second contact surfaces, said second contact surfaces being spaced from one another, said second contact surfaces being shaped to mate with said first contact surfaces in a sliding engagement, upon engagement of said second member with said first member and such that said second member slides relative to said first member;
   a locking mechanism for releasably retaining said second member at various longitudinal positions along said first member; and
   headliner supported within the vehicle that includes a longitudinally extending slot; said first contact surfaces being a bezel surrounding said slot.

14. The assembly of claim 13, wherein said second member further includes a longitudinally extending platform, said platform including
   a C-shaped cross section; and
   an integrally formed extension for forming a supporting area; and
   an arched rear surface; said rear surface includes two longitudinally extending rails which extend from opposite ends forming said second contact surfaces therebetween.

15. The assembly of claim 14, wherein said second member further includes at least two spaced extensions.

16. The assembly of claim 15, wherein said locking mechanism further includes said first member being a ratchet and said second member being a pawl.

17. The assembly of claim 15, wherein the locking mechanism further includes a projection extending from at least one of said second contact surfaces; and at least one of said first contact surfaces further including a plurality of longitudinally spaced grooves, such that said locations of spaced grooves along the length of at least one of said first contact surfaces coincide with desired longitudinal positions of said second member on said first member; said projection being shaped to releasably engage said spaced grooves.

18. The assembly of claim 17, wherein the projection is provided by a tension spring.

* * * * *